United States Patent
Carnaghi et al.

(10) Patent No.: US 6,422,638 B1
(45) Date of Patent: Jul. 23, 2002

(54) VEHICLE REAR WINDOW DROP GLASS MODULE

(75) Inventors: Joseph Frank Carnaghi, Macomb; Gordon Leroy Cook, Flint; Brian Hale Staser, Troy, all of MI (US); Mark A Vickery, Tecumseh (CA)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/688,621

(22) Filed: Oct. 16, 2000

Related U.S. Application Data
(60) Provisional application No. 60/160,600, filed on Oct. 20, 1999.

(51) Int. Cl.[7] .................................................. B60J 1/18

(52) U.S. Cl. ............................. 296/146.16; 296/190.1; 49/374

(58) Field of Search ..................... 296/146.16, 146.15, 296/190.1, 24.1, 63, 149; 49/374, 349

(56) References Cited

U.S. PATENT DOCUMENTS

| | | | | |
|---|---|---|---|---|
| 3,004,448 A | * | 10/1961 | Wanlass | |
| 3,339,665 A | * | 9/1967 | Johnstone et al. | |
| 3,566,540 A | * | 3/1971 | Hewitt | |
| 3,770,312 A | * | 11/1973 | Shadburn | |
| 4,119,341 A | * | 10/1978 | Cook | |
| 4,793,099 A | * | 12/1988 | Friese et al. | 49/374 X |
| 5,345,717 A | * | 9/1994 | Mori et al. | |
| 6,125,587 A | * | 10/2000 | Woods | 49/374 |
| 6,223,470 B1 | * | 5/2001 | Millard et al. | 49/374 |
| 6,260,905 B1 | * | 7/2001 | Wagner | 296/146.16 |

* cited by examiner

Primary Examiner—Joseph D. Pape
(74) Attorney, Agent, or Firm—Kathryn A. Marra

(57) ABSTRACT

A rear window module is designed for the rear window of a truck passenger cab. The rear window module is pre-assembled as a single unit having a housing attaching rigidly to a frame. The housing inserts into the cab from a rear opening. The frame attaches to a peripheral edge of the cab which defines the rear opening. The housing supports a motor actuated pane movement mechanism capable of moving a central pane positioned within the frame in a vertical direction. The rear window module may also include side vents capable of pivoting to an open position.

10 Claims, 5 Drawing Sheets

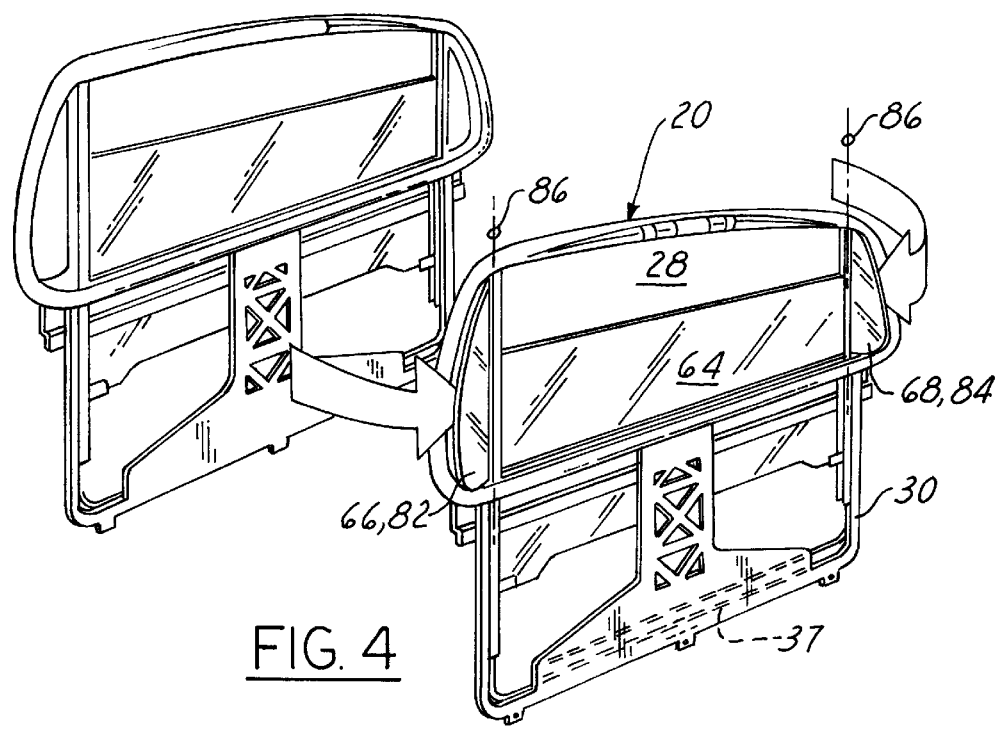
FIG. 4
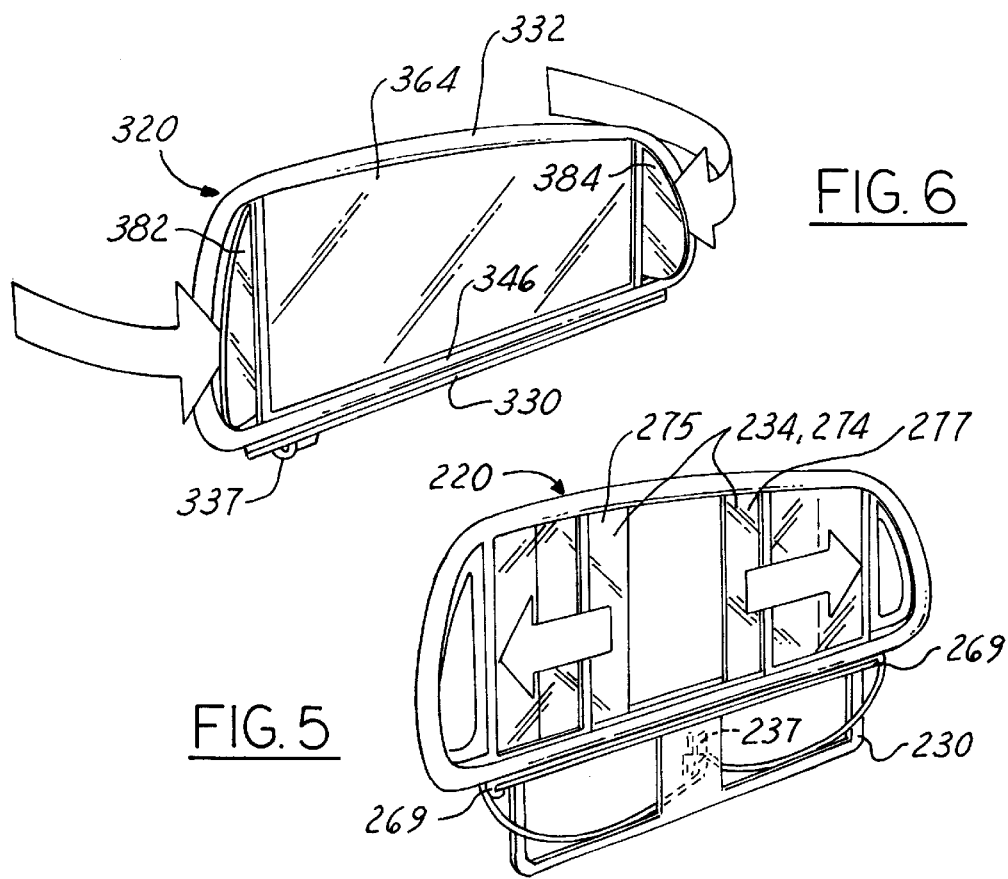
FIG. 6
FIG. 5

VEHICLE REAR WINDOW DROP GLASS MODULE

This Application claim benefit to provisional Application No. 60/160,600 Oct. 20, 1999.

TECHNICAL FIELD

This invention relates to a window drop glass module and more particularly to a rear window drop glass module for the passenger cab of a pick-up truck.

BACKGROUND OF THE INVENTION

The rear window of a pick-up truck is known to open manually for access between the passenger cab and the rear bed of the truck. The glass or pane typically slides horizontally within the confines of the window glass perimeter. Often, two panes are utilized, sliding in opposing horizontal directions when opening and engaging along the center of the window when fully closed. When the pane, or panes are fully open, the resultant opening amounts to approximately one third of the total window glass area therefore limiting ingress and egress between the pick-up bed and the cab. Furthermore, because the sliding action is manual, the occupant must park the vehicle prior to turning about within the cab to operate the sliding pane(s).

SUMMARY OF THE INVENTION

The invention provides a rear window module preferably for use in the passenger cab of a pick-up truck. The window module comprises a frame attached rigidly to a housing. The cab comprises a typical rear panel having a peripheral edge defining an opening. The housing after passing through the opening secures to an inward side of the rear panel of the cab and the frame attaches to the peripheral edge of the rear panel opening. Mounting within the frame is at least one window. Preferably, this one window has a central pane which moves up and down upon remote control and activation of a pane movement mechanism supported by the frame. The pane movement mechanism comprises a motor, a gear box, and push pull cables interconnecting the central pane to the gear box.

Thus a feature of the invention is a one piece rear window module capable of installation through a standard rear opening of a pick-up truck, thereby simplifying automotive assembly and reducing costs.

Another feature of the invention is the ability to pass larger objects through the open rear window of the cab.

These and other objects, features, and advantages of the invention will become more apparent from the following description of a preferred embodiment taken in conjunction with the accompanying drawings.

BRIEF DESCRIPTION OF THE DRAWINGS

The presently preferred embodiment of the invention is disclosed in the following description and in accompanying drawings, wherein:

FIG. 4 is a perspective view of the rear window module having a central pane, a left pivoting pane, and a right pivoting pane all shown partially open;

FIG. 5 is a perspective view of a second embodiment of the rear window module having a bisected central pane sliding horizontally and powered electrically;

FIG. 6 is a perspective view of a third embodiment of the rear window module having a stationary central window and left and right pivoting panes powered electrically;

DETAILED DESCRIPTION OF THE PREFERRED EMBODIMENT

Figure 1:
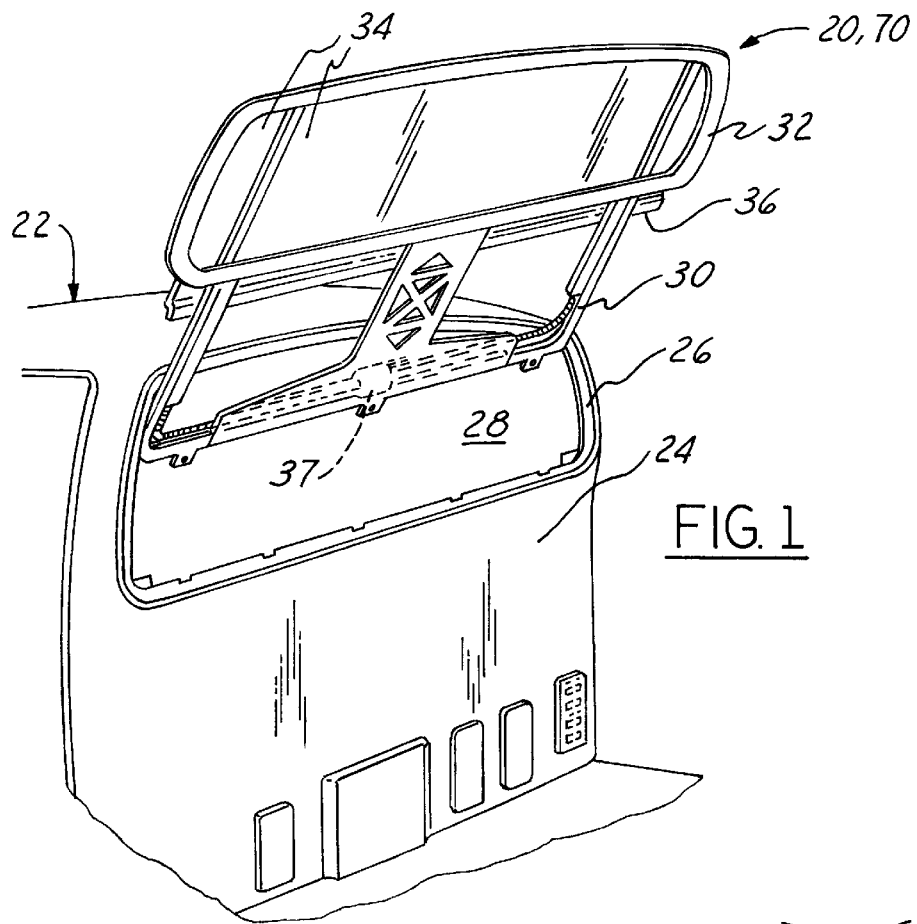
FIG. 1 is a perspective view of a rear window module of the present invention being inserted through an opening of a pick-up truck cab.

Referring to FIG. 1, inserting into a passenger cab 22 of a pick-up truck is a one piece rear window module 20. A rear panel 24 of the cab 22 has a periphery edge 26 which defines an opening 28. Housing 30 of the rear window module 20 inserts through the opening 28 and nests between the seat and the rear panel 24. The housing 30 connects to a frame 32 from beneath. The frame 32 supports at least one window 34 which may be any array of different window options described herein. Pre-attached to the housing 30 is an elongated belt line reinforcement 36 and a pane movement mechanism 37. The belt line reinforcement 36 is substantially horizontal and locates slightly below frame 32 inward to cab 22. The pane movement mechanism 37 enables movement of the at least one window 34 either manually or electrically.

Figure 2:
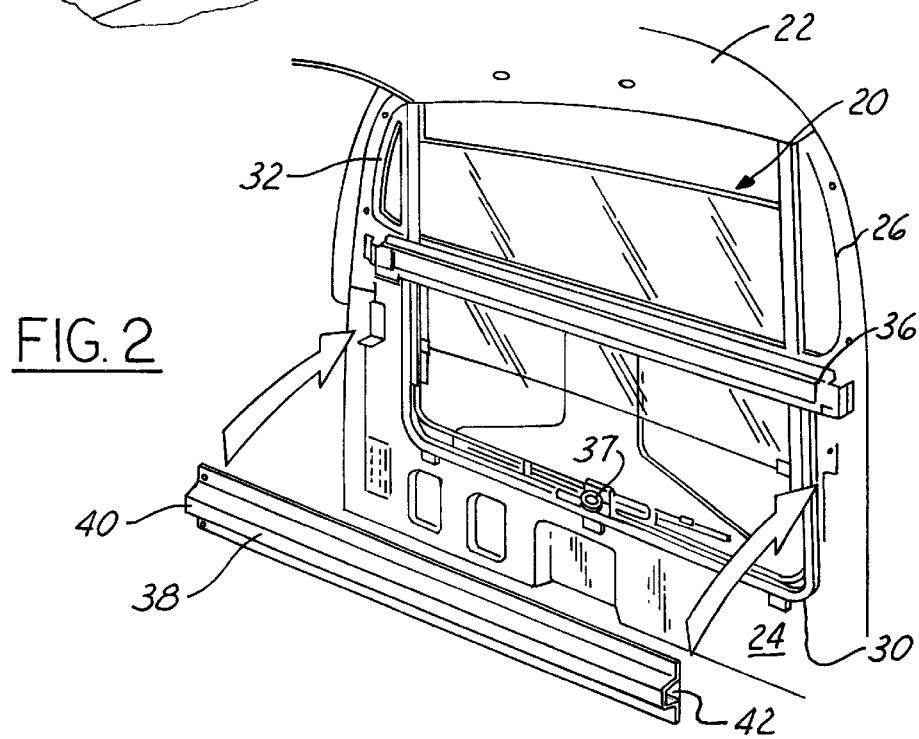
FIG. 2 is a perspective view of the installed rear window module viewed from the inside of the cab with a seatback support reinforcement detached.

Referring to FIG. 2, when the window module 20 is fully inserted into the cab 22, the housing 30 of the rear window module 20 attaches to the inward side of the rear panel 24. The frame 32 engages the outward side of the peripheral edge 26 of the rear panel 24. Expanding horizontally across the rear window module 20 is an elongated seat back support reinforcement 38. Seat back support reinforcement 38 has a first end 40 and a second end 42. First and second ends 40, 42 attach to the rear panel 24 at either side of the rear window module 20. Seat back support reinforcement 38 is generally horizontal and attaches to the rear panel 24 beneath the belt line reinforcement 36.

Figure 3:
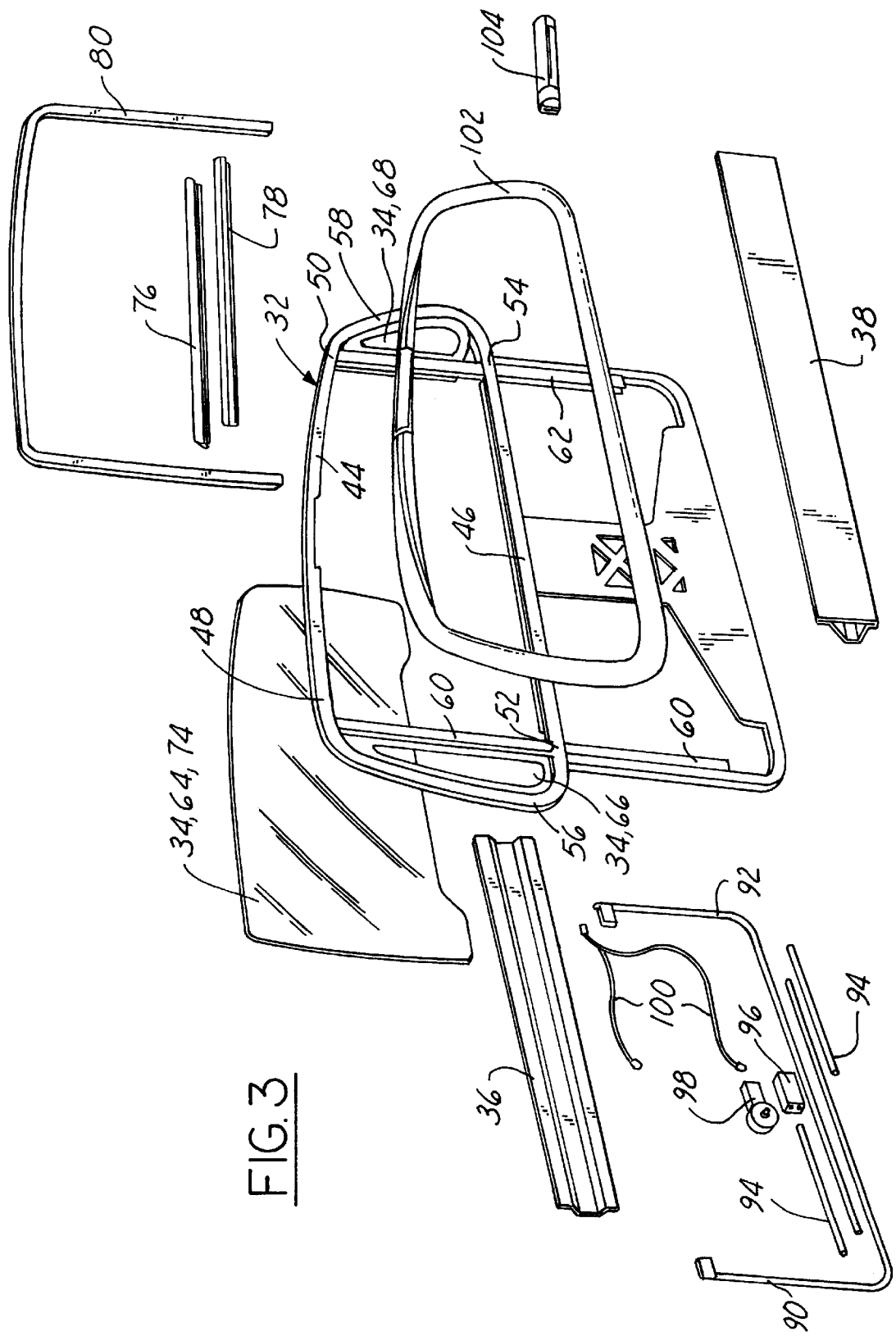
FIG. 3 is an exploded perspective view of the rear window module.
Figure 7:
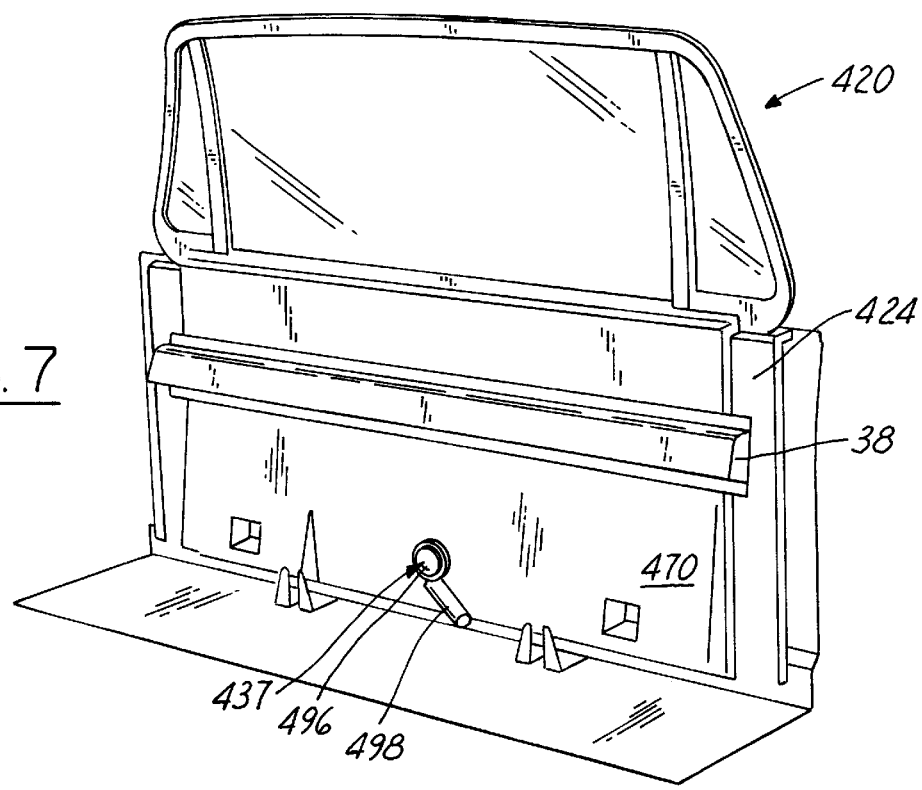
FIG. 7 is a perspective view of a fourth embodiment of the rear window module illustrating an outside view of a protective encasement.
Figure 8:
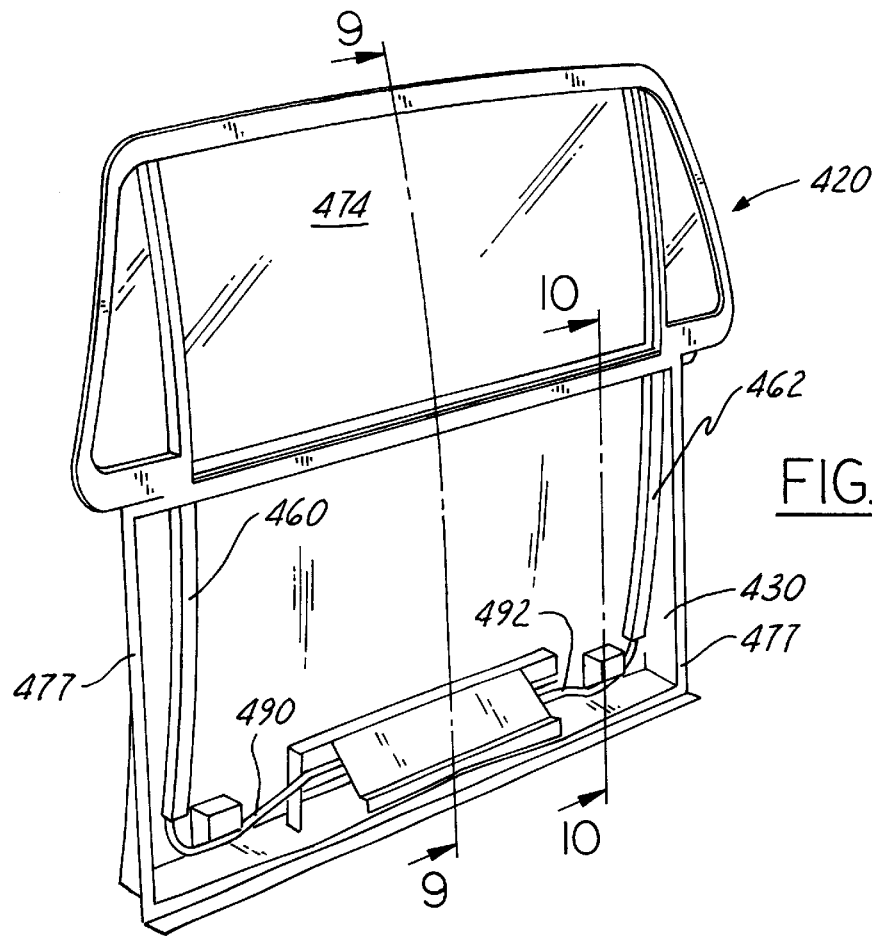
FIG. 8 is a perspective view of the fourth embodiment of the rear window module illustrating an inside view of the protective encasement.

Referring to FIGS. 2 and 3, the frame 32 has a top portion 44 and a bottom portion 46. Top portion 44 has a top left end 48 and a top right end 50. Bottom portion 46 has a bottom left end 52 and a bottom right end 54. A left portion 56 extends between and connects to the top left end 48 and the bottom left end 52. A right portion 58 extends between the top right end 50 and the bottom right end 54. Also connecting to the top left end 48 and extending through the bottom left end 52 is a left frame member 60. A right frame member 62 connects to the top right end 50 and extends to the bottom right end 54. The left and right frame members 60, 62 are substantially vertical and perpendicular to the top and bottom portions 44, 46.

Figure 9:
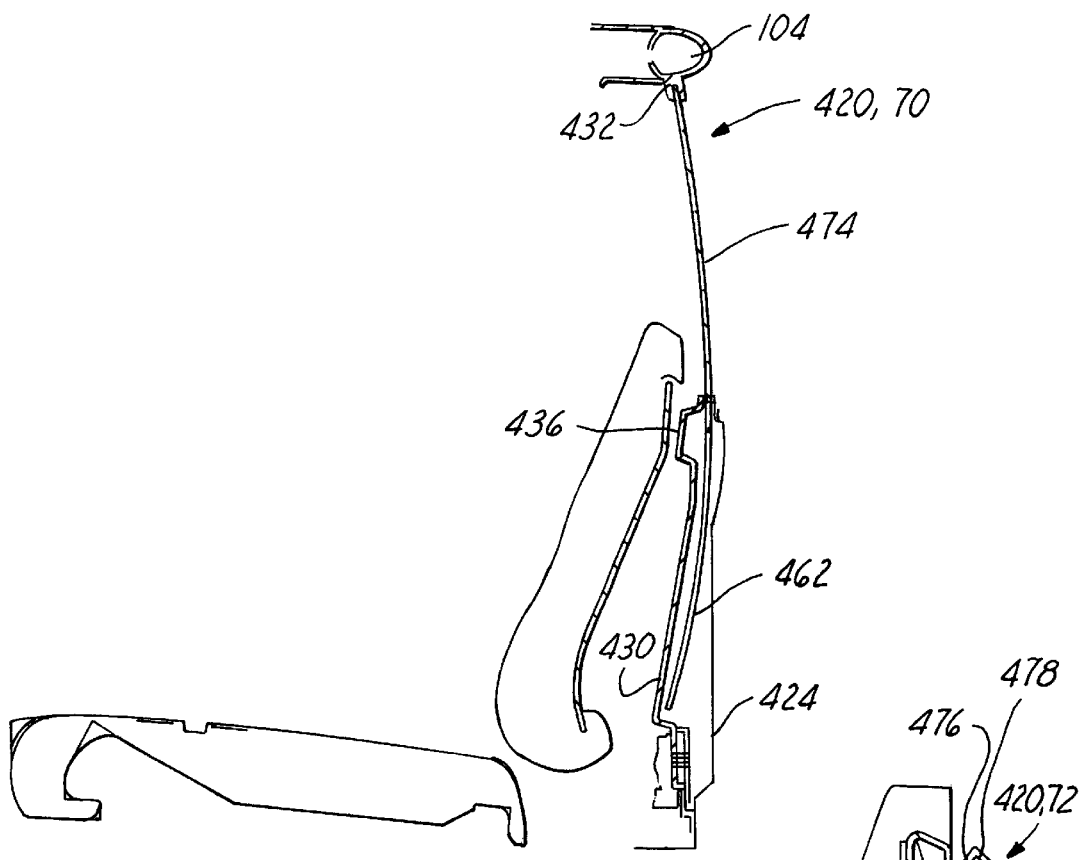
FIG. 9 is a cross sectional view of the fourth embodiment of the rear window module in the cab, viewed along line 9—9 of FIG. 8 in the direction of the arrows.
Figure 10:
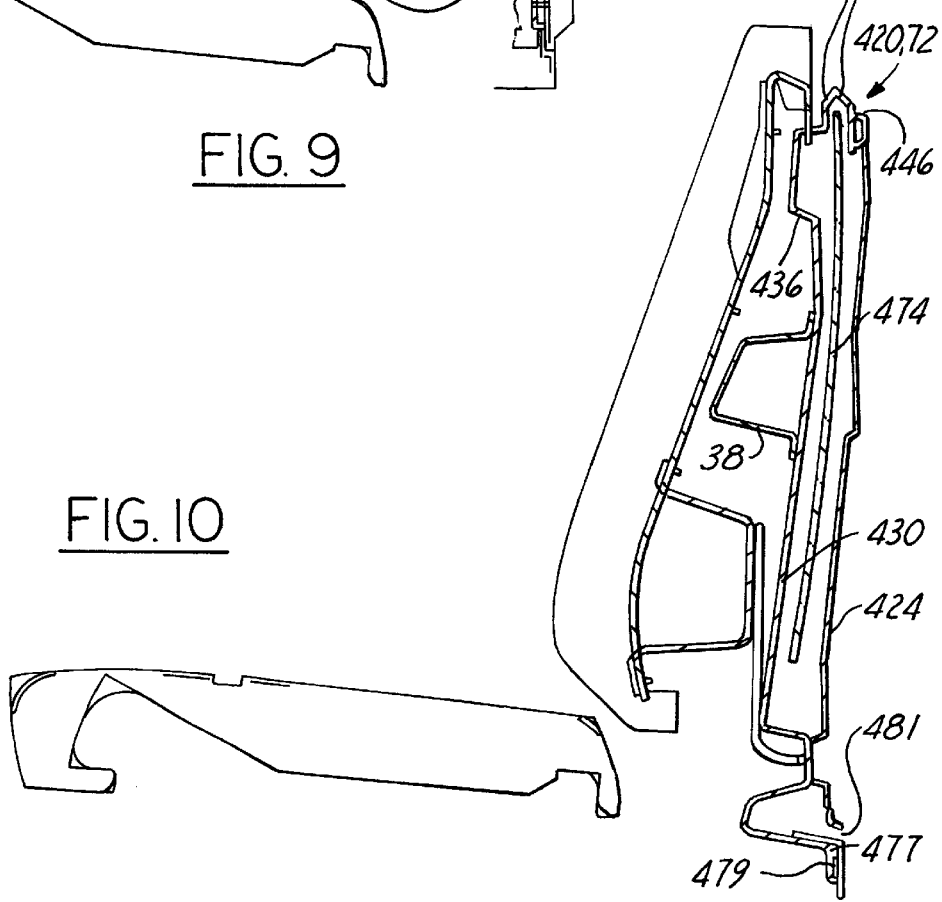
FIG. 10 is a cross sectional view of the fourth embodiment of the rear window module in the cab viewed along line 10—10 of FIG. 8 in direction of the arrows.

Window 34 is preferably trifurcated and includes a central window 64, a left window 66 and a right window 68. Central window 64 spans between and peripherally contacts the top portion 44, the bottom portion 46 and the left and right frame members 60, 62. Left window 66 spans between and contacts peripherally the left portion 56 and the left frame member 60. Right window 68 spans between and peripherally contacts the right frame member 62 and the right portion 58 of the frame 32. Any one or more of the central, left and right windows 64, 66, 68 may move from a close position 70 (see FIGS. 1 and 9) to an open position 72 (see FIG. 10) or any intermediate position therebetween.

Referring to FIGS. 3 and 4, the central window 64 preferably is a central pane 74 which moves generally up and down via the pane movement mechanism 37, sliding along the left and right frame members 60, 62. When compared to a fixed central window 64, the closed central pane 74 positions further into the cab 22. The realigned positioning of the central pane 74 to that of a fixed pane is required so that the central pane 74 can extend downward beyond the peripheral edge 26 inward of the rear panel 24 within the cab 22. Interior and exterior belt weather strips 76, 78 mount to the bottom portion 46 of the frame 32 and slideably contact the respective interior and exterior sides of central pane 74 thereby minimizing ingress of dirt and water into the housing 30 and cab 22. A continuous glass run channel seal 80 engages along the left and right frame members 60, 62 and the top portion 44. Glass run channel seal 80 receives the leading edges of the central pane 74 above the weather strips 76,78 when the central pane 74 is in the closed position 70. When incorporating weather strips 76, 78, a means to collect water leaking through the weather strip 78 and central pane 74 is required. This water collection or management means is separate from the rear window module 20 and may comprise holes within the rear panel 24 and a typical flexible plastic sheet having an adhesive around the sheet perimeter. The adhesive adheres to the inside of the rear panel 24 forming a watertight seal. The sheet separates the holes of the rear panel 24 from the remainder of cab 22. Water collecting through the weather strip 78 into cab 22 is channeled by the watertight sheet back out of the cab 22 through the holes in the rear panel 24.

Whether the central window 64 is a moveable central pane 74 or not, the left and right windows 66, 68 may be left and right pivoting panes 82, 84 respectively. Both the left and right pivoting panes 82, 84 manually pivot about respective, substantially vertical, pivoting axes 86.

Pushing and pulling the central pane 74 is a left and right push pull cable 90, 92 of the pane movement mechanism 37. The left and right push-pull cables 90, 92 interconnect to left and right sides of the central pane 74 via glass pads. The left and right push pull cables 90, 92 extend through cable guide tubes 94 and connect to a gearbox 96 of the pane movement mechanism 37. The gearbox 96 rotates manually via a hand lever (not shown) or may be electrically driven by a motor 98. The motor 98 is controlled through a wire harness 100 connected to a remote control switch.

After pre-assembly and installation of the rear window module 20, a reveal molding 102 engages to the exterior side of the frame 32. As is standard with many truck applications, a brake light 104 may be attached to the reveal molding 102.

Referring to FIG. 5, a second embodiment of the rear window module 220 is shown wherein the central pane 274 is bisected vertically into horizontally sliding panes 275 and 277. The trifurcated window 34 of the previous embodiment, now becomes a window 234 having two sliding panes and two fixed or pivoting panes. The height of housing 230 of the second embodiment is less than the height of housing 30 since housing 230 does not store the central pane 274. The bisected panes of central pane 274 store within the confines of the at least one window 234 or peripheral edge 226. The housing 230 must still support the pane movement mechanism 237 which now has two additional pulleys 269 required to change the pane movement from a vertical direction to an opposing horizontal direction.

Referring to FIG. 6, a third embodiment of the rear window module 320 is shown wherein the central window 364 is fixed and the left and right pivoting panes 382, 384 are powered. The downward displacement or height of window module 320 is minimal. The pane movement mechanism 337 actuates along a horizontal linear track or housing 330. Housing 330 is substantially parallel to and engages the bottom portion 346.

Referring to FIGS. 7–10, a fourth embodiment of the rear window module 420 is shown having a window configuration similar to that of the rear window module 20 of FIGS. 1–3. In the fourth embodiment, the housing 430 takes the form of the protective encasement. When the central pane 474 is in the open position 72 the central pane 474 is disposed between the protective encasement 430 and the rear panel 424 of the cab 22. The belt line reinforcement 436 is preferably integral and unitary to the protective encasement 430. Furthermore, the belt line reinforcement 436 may be horizontal and flush with the bottom portion 446 of the frame 432. The interior belt weather strip 476 can be mounted directly to the integral belt line reinforcement 436. The seat back reinforcement 38 spans across the protective encasement 430. The first and second ends 40, 42 of the seat back support reinforcement 28 are engaged as before to the rear panel 424 of the cab 22.

With the central pane 474 in the closed position 70 the protective encasement 430 is disposed between the seat back support reinforcement 38 and the rear panel 424. When the central pane 474 is in the open position 72 the protective encasement 430 protects the glass along with the left and right push pull cables 490, 492 of the pane movement mechanism 437. The motor 498 and the gearbox 496 are preferably mounted to the exterior or that side facing into the cab 22 of the protective encasement 430 and are therefore visually apparent to an occupant of the cab 22 when the seat back is pivoted forward.

The continuous panel feature of the protective encasement 430 provides two additional or inherent functions: first, the encasement 430 channels water, entering into the cab 22 through the outer belt weather strip seal 478, back out through the rear panel 424; and second, the protective encasement 430 assures that the moving central pane 474 is not blocked from shifting cargo or rubbish stored behind the occupant seat. To channel water, a continuous seal 479 is disposed between a peripheral edge 477 of the protective encasement 430 and the rear panel 424. The peripheral edge 477 engages to the rear panel 424 and thereby compresses the seal 479 forming a watertight or water management compartment defined by the protective encasement 430 and the rear panel 424. The rear panel 424 has at least one drain hole 481 communicating with the water management compartment. The drain holes 481 assure that water collecting within the water management compartment drains back out through the rear panel 424.

Although the preferred embodiments of the present invention have been disclosed, various changes and modifications may be made thereto by one skilled in the art without departing from the scope and spirit of the invention as set forth in appended claims. It is also understood that the terms used here are merely descriptive rather than limiting in that various changes may be made without departing from the scope and spirit of the invention.

What is claimed is:

1. A rear window module for a vehicle having a cab that has a rear panel, the rear panel having a periphery edge defining a cab rear opening, the rear window module comprising:

a housing shaped for insertion through the cab rear opening from outside of the cab;

a frame attached rigidly to the housing and shaped to mount to the periphery edge of the rear cab opening;

a pane movement mechanism supported by the housing;

at least one window mounted within the frame, the at least one window having at least one moveable pane interconnected to the pane movement mechanism; and an elongated seat back support reinforcement adapted to engage to the rear panel at both ends, so that the housing is disposed between the rear panel of the cab and the seat back support reinforcement beneath the cab rear opening of the cab when the rear window module is assembled to the cab.

2. The rear window module as set forth in claim 1 wherein the pane movement mechanism has an electric motor, a gear box, and two cooperating push-pull cables attached to the at least one moveable pane.

3. The rear window module as set forth in claim 2 comprising:

the frame having a top portion, a bottom portion, a left portion and a right portion, the top portion having a top left end and a top right end, the bottom portion having a bottom left end and a bottom right end, the left portion extended between the top left end and bottom left end, the right portion extended between the top right end and the bottom right end; and a left frame member attached to the top left end and extended through the bottom left end;

a right frame member attached to the top right end and extended through the bottom right end;

a left window of the at least one window engaged peripherally to the left portion and the left frame member;

a right window of the at least one window engaged peripherally to the right portion and the right frame member; and a central window of the at least one window engaged peripherally to the top portion, the bottom portion, the left frame member and the right frame member, and the at least one moveable pane selected from the group consisting of the left window, the right window and the central window.

4. The rear window module as set forth in claim 3 wherein the central window is a moveable pane sliding vertically.

5. The rear window module as set forth in claim 3 wherein the left and right windows are pivoting vent panes.

6. The rear window module as set forth in claim 5 wherein the pivoting vent panes pivot about a vertical pivoting axis.

7. The rear window module as set forth in claim 1 further comprising an elongated beltline reinforcement disposed above and parallel to the seat back support reinforcement, the beltline reinforcement adapted to engage to the rear panel at both ends, the housing disposed between the rear panel and the beltline reinforcement when the rear window module is assembled to the cab.

8. The rear window module as set forth in claim 7 further comprising a reveal molding engaged to the exterior of the frame and adapted to engage to cab at the cab rear opening.

9. A rear window module for the passenger cab of a pick-up truck, the module insertable through an opening of a rear panel of the cab and engageable to a peripheral edge defining the opening, the rear window module comprising:

a frame having a top portion, a bottom portion, a left portion and a right portion, the top portion having a top left end and a top right end, the bottom portion having a bottom left end and a bottom right end, the left portion extended between the top left end and bottom left end, the right portion extended between the top right end and the bottom right end;

a left frame member attached to the top left end and extended through the bottom left end;

a right frame member attached to the top right end and extended through the bottom right end;

a housing being a protective encasement attached rigidly to and extending below the frame, the protective encasement capable of insertion through the opening from outside of the cab and adapted to engage to the rear panel of the cab, the frame adapted to mount to the peripheral edge of the opening;

a left window spanning between and engaged peripherally to the left portion and the left frame member;

a right window spanning between and engaged peripherally to the right portion and the right frame member;

a central pane having a closed position and an open position, the central pane extending between and slideably engaged to the left and right frame members, the central pane contacting the top portion and extending through the bottom portion when in the closed position, the central pane disposed between the protective encasement and the rear panel of the cab when in the open position;

a pane movement mechanism supported by the protective encasement, the pane movement mechanism having an electric motor, a gear box, and two cooperating push-pull cables attached to the central pane, an elongated horizontal beltline reinforcement integral and unitary to the protective encasement; and an elongated seat back support reinforcement disposed parallel to the beltline reinforcement and adapted to engage to the rear panel of the cab at both ends, the protective encasement disposed between the seat back support reinforcement and the central pane when the rear window module is assembled to the cab and the central pane is in the open position.

10. The rear window module as set forth in claim 9 wherein the left and right windows are pivoting vent panes.

* * * * *